(12) United States Patent
Honbo et al.

(10) Patent No.: US 6,458,488 B1
(45) Date of Patent: Oct. 1, 2002

(54) POSITIVE ELECTRODE ACTIVATOR FOR LITHIUM SECONDARY BATTERY AND LITHIUM SECONDARY BATTERY

(75) Inventors: Kyoko Honbo, Hitachinaka; Akihiro Gotoh, Hitachi; Masahiro Kasai, Mito; Yasushi Muranaka, Hitachinaka; Yoshiji Hotta, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/689,797

(22) Filed: Oct. 13, 2000

(30) Foreign Application Priority Data

Oct. 14, 1999 (JP) .............................. 11-291945

(51) Int. Cl.⁷ .................................. H01M 4/50
(52) U.S. Cl. ...................... 429/224; 429/209; 429/218.1
(58) Field of Search ............................ 429/209, 218.1, 429/224

(56) References Cited

U.S. PATENT DOCUMENTS 5,674,645 A * 10/1997 Amatucci et al. ........... 423/464

FOREIGN PATENT DOCUMENTS

JP 2000067864 * 3/2000

* cited by examiner

*Primary Examiner*—Carol Chaney
*Assistant Examiner*—Dah-Wei Yuan
(74) *Attorney, Agent, or Firm*—Antonelli, Terry, Stout & Kraus, LLP

(57) ABSTRACT

A lithium secondary battery characterized by a high power capacity and a long service life has a negative electrode 3, a positive electrode 2 and a non-aqueous electrolyte containing lithium salt. The lithium secondary battery is characterized by further comprising multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively) as a positive electrode activator.

6 Claims, 4 Drawing Sheets

VALUE OF b IN $LiMn_{2-b}M_bS_{0.01}O_{4.08}$

VALUE OF a IN $Li_{1.01+a}Mn_{1.6-a}Ni_{0.4}S_{0.01}O_{4.08}$

FIG. 6

VALUE OF c IN $LiMn_{1.6}Ni_{0.4}Si_cO_{4+d}$

FIG. 7(a)

DISTANCE FROM PARTICLE SURFACE d

FIG. 7(b)

CROSS SECTIONAL VIEW OF PARTICLE

POSITIVE ELECTRODE ACTIVATOR FOR LITHIUM SECONDARY BATTERY AND LITHIUM SECONDARY BATTERY

BACKGROUND OF THE INVENTION

The present invention relates to a positive electrode activator used in the lithium secondary battery and a lithium secondary battery using said activator.

In recent years, the secondary battery is one of the indispensable components as a power supply for personal computers and cellular mobile telephones and as a power supply for electric cars and power storage.

Portable computers (including pen-based portables) and mobile computing equipment such as portable information terminals (personal digital assistant, personal intelligent communicator or hand-held communicator) are required to provide a compact configuration and light weight.

However, a high voltage is required because a great amount of power is consumed by the back light of the liquid crystal display panel, plotting control and a disk drive motor. Power capacity is currently obtained by increasing the number of batteries to be connected in series. For this reason, it is difficult at present to achieve a compact configuration and light weight of the system.

Furthermore, electric cars free of emission gas and noise are attracting keen interest as a result of rising awareness of the global environmental problem. However, electric cars requires voltage higher than 300 volts. This increases the number of batteries to be connected in series, giving rise to such problems as short traveling distance, poor acceleration properties, limited in-car space and poor car body stability.

Of the secondary batteries, especially the lithium secondary battery using non-aqueous electrolyte is attracting attention because it is expected to provide high voltage, light weight and high energy density.

For example, $Li_xCoO_2$, etc. disclosed in the Official Gazette of Japanese Patent Laid-Open NO.136131/1980 provides an electromotive force of 3.6 to 3.8 volts or more for Li/Li(+), and is commonly used as a high energy density secondary battery positive electrode.

Furthermore, it is known that spinel based lithium manganate provides a high voltage of 4.6 to 4.7 volts when part of manganese is replaced with nickel (Journal of Electrochemical Society) 1994, Vol.141, P. 2,279).

The following two batteries are disclosed as lithium secondary batteries made of battery materials providing a high voltage in a similar manner; (1) a non-aqueous secondary battery made of spinel based lithium manganese multiple oxide (Official Gazette of Japanese Patent Laid-Open NO.073962/1999) represented by general formula $Li_xMn_{(2-y-z)}M_yCr_zO_{(4+p)}$ (where M denotes Ni or Co) and having a potential of 4.5 volts or more for Li/Li (+). and (2) a lithium battery made of lithium inserted compound represented by general formula $Li_{x+y}Mn_{(2-y-z)}M_zCr_zO_4$ (where M denotes transition metal) and having a potential of 4.5 volts or more for Li/Li (+) (Official Gazette of Japanese Patent Laid-Open NO.147867/1997).

To improve stability at the time of charging and discharge, a lithium secondary battery s proposed in Official Gazette of Japanese Patent Laid-Open NO. 250119/1996 where charcogenide made up by replacing part of oxygen in the conventional metal oxide with a specified amount of a specific charcogen is used as a positive electrode activator instead of conventional metal oxide.

Spinel based lithium manganate formed by replacing part of manganese replaced with nickel, spinel based lithium manganese multiple oxide represented by general formula $Li_xMn_{(2-y-z)}M_yCr_zO_{(4+p)}$ (where M denotes Ni or Co) and lithium inserted compound represented by general formula $Li_{x+y}Mn_{(2-y-z)}M_zCr_zO_4$ (where M denotes transition metal) provide the advantage of getting a high voltage of 4.5 to 4.7 volts. This makes it possible to reduce the number of batteries connected in series, thereby ensuring a compact configuration and light weight of the system.

However, only about 50 cycles of service life can be ensured according to evaluation of an enclosed type lithium secondary battery manufactured as a tentative product using these materials as a positive electrode.

The short cycle service life is attributable to the fact that organic component in electrolyte is easily if subjected to decomposition at a high voltage and is turned into vapor to be stored into the battery according to the prior art if charging and discharging of the enclosed lithium secondary battery are repeated at a high voltage of 4.5 to 4.7 volts. The stored gas not only interferes with electrochemical reaction by charging and discharging but also may cause the battery cylinder to expand and to explode in the final stage.

In the similar manner, the organic component is easily subjected to decomposition at a high voltage and is turned in to vapor to be stored in the battery easily, when using the electrolyte formed by dissolving $LiPF_6$ having a density of one mol/liter into the mixed solvent of ethylene carbonate and dimethyl carbonate blended at a ratio of 1 to 2 disclosed in Official Gazette of Japanese Patent Laid-Open NO.073962/1999, or the electrolyte formed by dissolving $LiBF_4$ having a density of 1.5 mol into the mixed solvent of ethylene carbonate and diethyl carbonate blended at a ratio of 30 to 70 disclosed in Official Gazette of Japanese Patent Laid-Open NO.147867/1997.

As described above, when charging and discharging of the enclosed lithium secondary battery is repeated at a high voltage according to the prior art, cycle life will exceed 500 cycles.

SUMMARY OF THE INVENTION

The object of the present invention is to provide a positive electrode activator for the lithium secondary battery and a lithium secondary battery using said activator, wherein said activator provides a high voltage and said battery ensures a service life of 500 cycles or more when designed in a enclosed battery structure.

The present invention relates the lithium secondary battery characterized in that charging termination voltage of the single battery is greater than 4.6 volts and smaller than 5.2 volts, and the average discharge voltage is greater than 4.3 volts and is smaller than 5.0 volts. The following summaries the present invention:

[1] A positive electrode activator for the lithium secondary battery composed of non-aqueous electrolyte including negative electrode, positive electrode and lithium salt; said positive electrode activator for secondary battery characterized by inclusion of the multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

[2] A positive electrode activator for the lithium secondary battery according to [1] wherein said positive electrode activator comprises (1) the multiple oxide represented by a general formula $Li_{x+a}Mn_{2-a-b}M_bQ_cO_{4+d}$ (where M denotes at least one element selected from among Ni, Fe, Co, Cu and Cr+Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively), and (2) the tilting function material where Q has a higher density on the surface layer than inside the particle.

[3] A positive electrode activator for the lithium secondary battery composed of non-aqueous electrolyte including negative electrode, positive electrode and lithium salt; said positive electrode activator characterized by inclusion of the multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

[4] A positive electrode activator for the lithium secondary battery according to [3] wherein said positive electrode activator further characterized by containing a tilting function material where Q of the multiple oxide has a higher density on the surface layer than inside the particle; said multiple oxide being represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

Primary particles (of the order of submicrons) and/or secondary particles (aggregate of primary particles) of said particles are composed of tilting function materials where the multiple oxide Q has a higher density inside than on the surface layer.

DETAILED DESCRIPTION OF THE INVENTION

The secondary battery of the present invention permits stable charging and discharging at a higher voltage than the conventional secondary battery. Especially, it provides a excellent lithium secondary battery having a charging and discharging life of 500 cycles or more.

The secondary battery of the present invention is characterized in that charging and discharging are performed at a higher voltage than in the conventional secondary battery, and thee positive electrode material used allows stable charging and discharging in an enclosed battery system at a higher voltage as well.

The value of x+a representing the volume of Li is changed by charging and discharging. In other words, deintercalation of Li ion is caused by charging, and the value of x+a is reduced. Intercalation of Li ion by discharge occurs to increase the value of x+a.

If the volume of Li is greater than 1.6, an excessive volume of by-products such as lithium carbonate, lithium oxide and lithium hydroxide will be generated in the process of baking. These substances will react as a bond when manufacturing electrodes, with the result that electrodes cannot be manufactured successfully. To manufacture electrodes successfully, the volume of by-products should be as small as possible, and the value of x+a is preferred not to exceed 1.6.

Furthermore, it is preferred that Mn be replaced with at least one element selected from among Ni, Fe, Co, Cu and Cr represented as M.

The value of b denoting the volume of M is not changed by charging and discharging, but is within the range of $0.05 \leq b \leq 1.0$. When b is less than 0.05, charging and discharging capacity is low at a high voltage without the effect of M sufficiently utilized, and this is not preferred. When b exceeds 1.0, a great amount of by-products will be generated. Especially M unable to react any more remains as oxide, with the result that capacity is reduced. This is not preferred.

Q is at least one element selected from among C, N, S, P, Si, F, Cl, I and Br, and the added volume c thereof is within the range of $0.000001 \leq c < 0.05$. If c is less than 0.000001, the effect of Q is not sufficiently utilized. Thus organic component in electrolyte is easily subjected to decomposition at a high voltage and is turned into vapor to be stored into the battery, with the result that battery service life is reduced. Furthermore, if c exceeds 0.05, resistance inside the activator is increased to reduce capacity. This is not preferred.

The "d" related to the volume of O (oxygen) differs according to the type of "Q" and the added volume thereof. When c is within the range of $0.000001 \leq c < 0.05$, d is within the range of $0 \leq d \leq 0.1$.

Furthermore, the positive electrode activator according to the present invention is characterized by containing a functionally gradient material where Q in the multiple oxide expressed by the general formula $Li_{x+a}Mn_{2-a-b}M_bQ_cO_{4+d}$ has a higher density on the surface layer than inside the particles (including primary and/or secondary particles).

The reason is that reaction of decomposition of the organic compound in the electrolyte at a high voltage is carried out by the action of catalyst of M which is highly oxidized on the positive electrode surface. So the field of reaction is limited to the particle surface. Therefore, when the density of Q in the multiple oxide is higher on the surface layer than inside the particles, the effect to reducing decomposition of the organic component in the electrolyte at a high voltage is effectively utilized, thereby ensuring longer service life.

The main composition inside particles of said positive electrode activator is expressed by the general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

The production method for said positive electrode material is not restricted in any particular manner. It can be produced by adding the material containing C, N, S, P, Si, F, Cl, I and Br, for example, $SiO_2$, $SiS_2$, LiF, $Li_3PO_4$, LiCl, $P_4S_3$, $P_4S_7$, $H_3PO_4$, $CS_2$, $Cl_4$, $CBr_4$, tar and the like to other materials, and by baking the positive electrode activator at a specified temperature.

Furthermore, it can also be synthesized as follows: A compound expressed by the general formula $Li_{x+a}Mn_{2-a-b}M_bO_4$ (where M denotes at least one element selected from among Ni, Fe, Co, Cu and Cr; and x, a and b are within the range of $0 \leq x \leq 1.1$, $0 \leq a \leq 0.5$, and $0.05 \leq b \leq 1.0$, respectively) is synthesized in advance, and is treated in the gas phase of $CF_4$, $COCl_2$, COS, $NF_3$, $NCl_3$, NOF, $NOC_1$, $NO_2F$, $NO_2Cl$, $PF_5$, $PF_3$, $PCl_5$, $POF_3$, $POCl_3$, $HPF_6$, $SiF_4$, $SiHCl_3$ and the like according to CVD method using radio frequency plasma, etc., irradiation of ultraviolet ray, low temperature baking in the above-mentioned atmosphere. Furthermore, it can also be obtaining by dipping said positive electrode activator in the liquid of $CCl_4$, $HBrO_4$, $BeF_3$, BrCl, $CS_2$, HNCS, $IF_5$, $I_2O_4$, $I_2O_5$, $HPO_2F_2$, $H_3PO_4$, $Si(CH_3)_4$, $SiF(CH_3)_3$, $SiCl(CH_3)_3$, $SiI(CH_3)_3$ and the like under a specified temperature and by drying it. It can also be obtained by adding it into electrolyte.

The negative electrode activator is not particularly restricted. However, the battery of the present invention exhibits excellent characteristics if it contains at least one of low crystalline carbon and high crystalline carbon selected from among conductive materials such as graphite, thermally decomposed graphite, carbon fiber, carbonaceous material of gas phase growth, pitch based carbonaceous material, coke based carbonaceous material, phenol based carbonaceous material, rayon based carbonaceous material, polyacrylo nitrile based carbonaceous material, glassy carbon, carbon black, furfuryl alcohol based carbonaceous material and polyparaphenylene; or the carbon material containing a combination of multiple numbers of them.

The electrolyte is not particularly restricted. It is possible to use;

(A) mixed solutions between (1) at least one non-aqueous solvent selected from among the groups consisting of propylene carbonate, propylene carbonate derivative, ethylene carbonate, butylene carbonate, vinylene carbonate, γ-butyl lactone, dimethyl carbonate, diethyl carbonate, methyl ethyl carbonate, 1,2-dimethoxy ethane, 2-methyltetrahydrofuran, dimethylsulfoxide, 1,3-dioxolone, formaldehyde, dimethylformaldehyde, dioxolane, acetonitrile, nitromethane, methyl formate, methyl acetate, ethyl propionate, methyl propionate, triester phosphate, trimethyl phosphate, triethyl phosphate, trimethoxy methane, dioxolane derivative, diethyl ether, 1,3-propanesultone, sulfolane, 3-methyl-2-oxazolidinone, tetrahydrofran, tetrahydrofran derivative, dioxolane, 1,2-diethoxy ethane, or their halides; and (2) lithium salt, for example, at least one salt selected from among $LiClO_4$, $LiBF_4$, $LiPF_6$, $LiCF_3SO_3$, $LiCF_3CFSO_3$, $LiCF_3CO_2$, $LiAsF_6$, $LiSbF_6$, $LiB_{10}Cl_{10}$, $LiAlClO$, LiCl, LiBr, LiI, lower aliphatic lithium carbonate, chloroborane lithium and lithium quaterphenyl borate; or (B) gel-formed electrolyte obtained by mixing (1) these mixture solutions with (2) polymer for example, at least one selected from a group consisting of polyacrylonitrile, polyethylene oxide, polyvinylidene fluoride, methyl polymethacrylate, and hexaphloropropylene, etc. This is because positive electrode material to control decomposition of electrolyte according to the present invention is used.

The field of application of a lithium secondary battery according to the present invention characterized by its capability of charging and discharging is not particularly restricted. It can be used as power supply for such equipment as for example, a notebook personal computer, pen-based personal computer, pocket personal computer, notebook word processor, pocket word processor, electronic player, cellular mobile telephone, cordless phone handset, pager, handy terminal, portable copier, electronic personal organizer, calculator, liquid crystal TV, electric shaver, power tool, electronic translating machine, car telephone, transceiver, voice input equipment, memorycard, backup power supply, tape recorder, radio set, headphone stereo, portable printer, handy cleaner, portable CD, video movie, navigation system. It can also be used as power supply for a refrigerator, air conditioner, TV, stereo set, water heater, microwave oven, dish washer, washing machine, drier, game machine, illumination equipment, toy, road conditioner, medical equipment, car, electric car, golf cart, motor driven cart, power storage system, etc. It can also be used for power supply for space activities as well for consumer products.

If an enclosed lithium secondary battery is charged under the condition that charging termination voltage of a single battery is as high as 4.7 volts according to the prior art, the organic component in electrolyte is easily decomposed and turned into vapor to be stored in the battery. This has been a problem of the prior art. This problem can be solved by using the positive electrode material according to the present invention.

Spinel based lithium manganate obtained by replacing part of manganese with nickel according to the prior art, spinel based lithium manganese multiple oxide expressed by a general formula $LixMn_{(2-y-z)}M_yCr_zO_{(4+p)}$ (where M denotes Ni or Co), and the lithium inserted compound expressed by a general formula $Li_{x+y}Mn_{(2-y-z)}M_zCr_zO_4$ (where M denotes transition metal) hardly decompose the organic component in electrolyte in the uncharged state at a low potential, for example, at 3 to 4 volts.

However, in the charged state at high potential, for example, at 4.3 volts or more, the affinity unit of Mn, Ni, Cr, CO, and other transition metal is into divalent to trivalent or still higher (tetravalent or more). Said transition metal in such highly oxidized state has an extremely high electrocatalyst activity for decomposition on of the organic component in electrolyte. So decomposed gas such as $CO_2$, hydrogen, methane, ethane, ethylene and propane is generated.

The authors of the present invention considers that the catalyst effect can be controlled and electrolyte decomposition can be reduced to prevent gas from generating, by adding the element acting as catalyst poison or the element allowing chemical adsorption to the catalyst active point on a selective basis in order to ensure that said transition metal in highly oxidized state does not have high electrocatalyst activity for decomposition on of the organic component in electrolyte.

Based on this way of thinking, the authors of the present invention studied addition of different elements ranging over a great number of types. This study has led to the material mentioned in the present invention. The material with the addition of C, N, S, P, Si, F, Cl, I and Br is used as the positive electrode material according to the present invention.

When the material is synthesized, these elements allows closely packed film to be formed on the surface of the positive electrode, or permits surface adsorption to take place onto the transition metal serving as an active point of the catalyst on an selective basis. In addition, the film containing these elements has an effect of catalyst poison which reduces the effect of the catalyst.

Thus, even when electrolyte made of $LiPF_6$ and $LiBF_4$ dissolved into the mixed solvent such as ethylene carbonate, dimethyl carbonate and diethyl carbonate is used, electrolyte decomposition can be reduced at a high voltage. Therefore, the cycle life of the enclosed battery is considerably prolonged.

Embodiment 1

To synthesize positive electrode materials of various compositions according to the present invention, $Li_2CO_3$, $MnO_2$, $Ni(NO_3)_2$, $Fe(NO_3)_2$, $Co_3O_4$, $Cu(NO_3)_2$, $CS_2$, LiF, LiCl, $SiO_2$, $Li_3PO_4$, tar, $Cl_4$, $CBr_4$ and $N_2S_5$ are used as materials. Ethanol is added to them after they have been weighed out to get the substances having the composition corresponding to the compound shown in FIGS. 2 to 6. Then they are mixed by a centrifugal ball mill at a room temperature for one hour.

After having been held in air at a temperature of 630 to 760 degrees Celsius for 20 hours, they are baked being held at 800 to 960 degrees Celsius for 20 hours. Graphite as a conducting agent and vinylidene polyfluoride as a bonding agent are added to the obtained positive electrode activator and were weighed out to get a weight percentage of 88:7:5. Then they are kneaded by a automatic mortar equipment, and are coated on both surfaces of aluminum foil having a thickness of 10 μm.

Ninety three wt. % of artificial graphite as negative electrode material and seven wt. % of vinylidene polyfluoride as binding agent are prepared to get a mixture agent, which is coated on both surfaces of a 10 micron thick copper foil.

Both positive and negative electrodes are rolled and molded by a press and terminals are spot welded. Then they are vacuum dried at 150 degrees Celsius for five hours.

Figure 1:
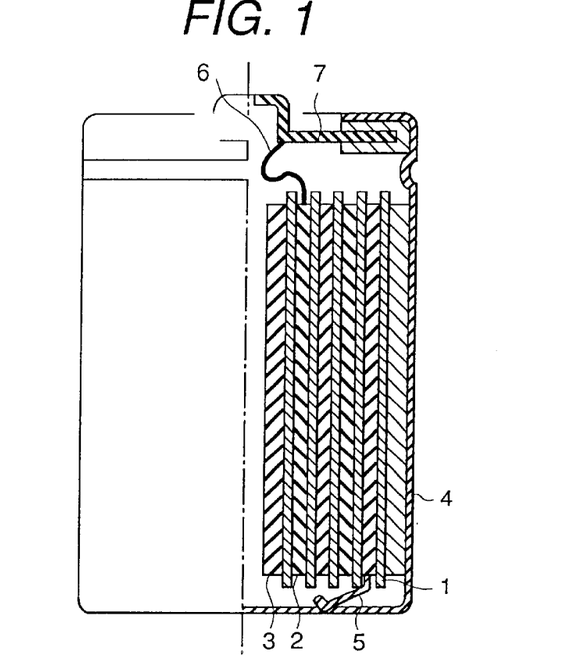
FIG. 1 is a schematic diagram representing a sectional view of an example of the structure of lithium secondary battery according to the present embodiment.

FIG. 1 is a schematic diagram showing a cross sectional view of one example of the battery structure according to Embodiment. Positive electrode 2 and negative electrode 3 are laminated through a separator 1 made of microporous polypropylene, and are wound in a coiled form to be inserted into four SUS-made battery containers. The negative electrode terminal 5 is welded to the battery cylinder 4, and the positive electrode terminal 6 is welded to the cover 7 in the battery.

Ethylene carbonate and diethyl carbonate are mixed at the volume ratio 30:70 as the non-aqueous solvent of electrolyte, and 1.5 mol of $LiBF_4$ is dissolved and poured into the battery container 4.

The battery cover 7 is mounted on the battery container 4 to form a cylindrical battery having a diameter of 18 mm and a height of 650 mm.

After having been charged at 1 CmA from 4.61 to 5.19 volts at a constant current, the battery is subjected to constant voltage charging at 4.61 to 5.19 volts for three hours. Then it is subjected to constant current discharge and is discharged down in 4.0 volts at 1 CmA. After that, discharge capacity and cycle life are evaluated. This experiment has confirmed that average discharge voltage is within the range greater than 4.3 volts and smaller than 5.0 volts.

Figure 2:
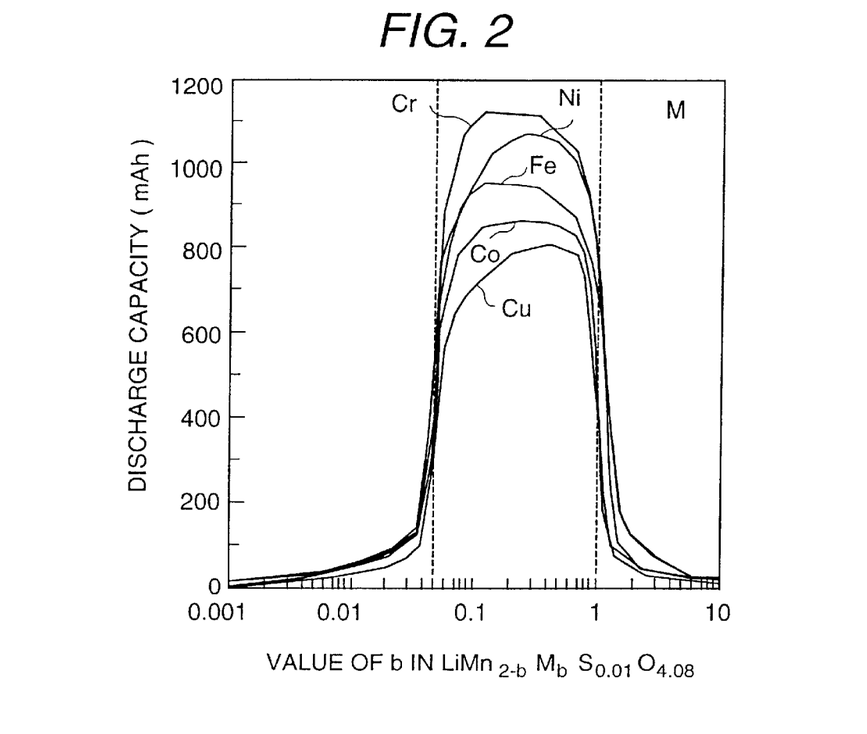
FIG. 2 is a chart representing the relationship between the value b of positive electrode activator $LiMn_{2-b}M_bS_{0.01}O_{4.08}$ (M=Ni, Co, Fe, Cu, Cr) and discharge capacity.

FIG. 2 is a chart representing the relationship between the value b showing a volume of replaced element in the positive electrode activator $LiMn_{2-b}M_bS_{0.01}O_{4.08}$ (M denotes Ni, Co, Fe, Cu and Cr) and discharge capacity. In any of elements Ni, Co, Fe, Cu and Cr, discharge capacity exhibits the maximum value in this experiment when the value b is within the range from 0.05 to 1.0.

Figure 3:
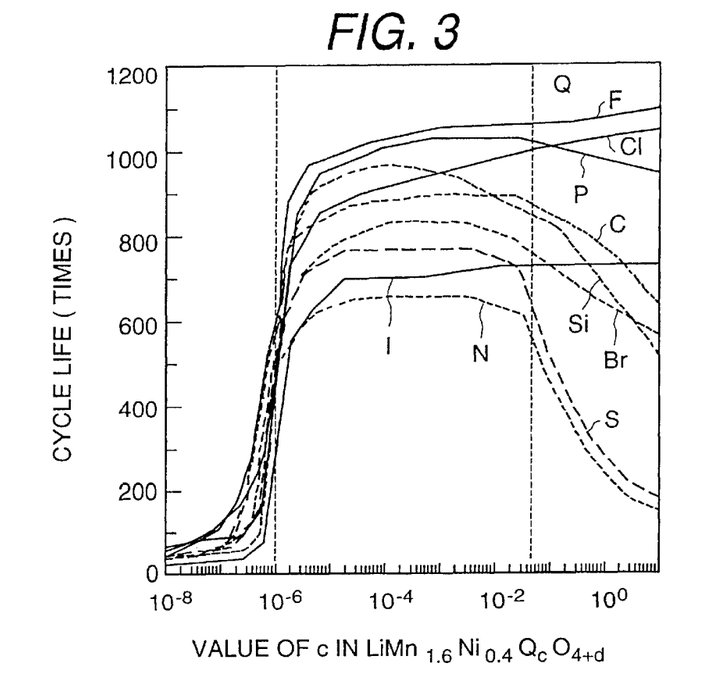
FIG. 3 is a chart representing the relationship between the value c of positive electrode activator $LiMn_{1.6}Ni_{0.4}Q_cO_{4+d}$ (Q=F, Cl, Si, Br, N) and cycle life.

FIG. 3 shows the relationship between the value c of the positive electrode activator $LiMn_{1.6}NQ_cO_{4+d}$ (Q denotes F, Cl, Si, Br and N) and cycle life.

Figure 4:
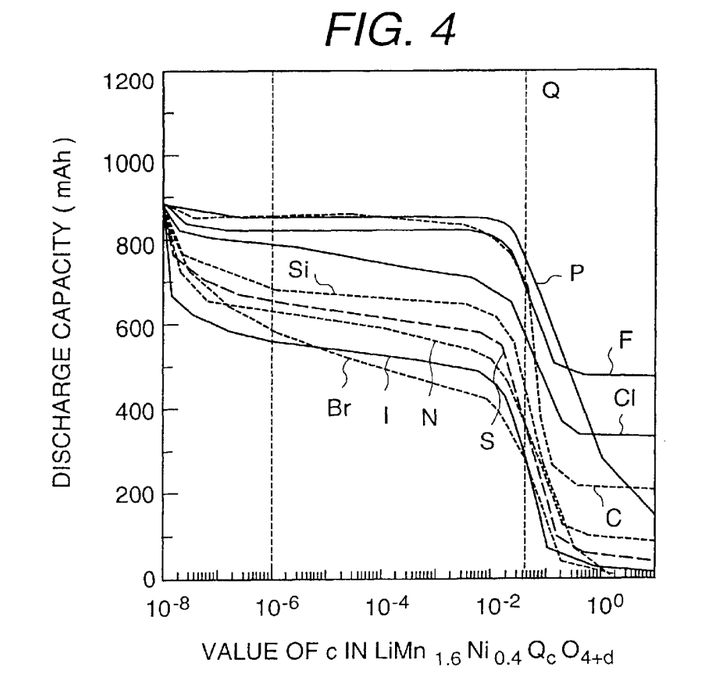
FIG. 4 is a chart representing the relationship between the value c of positive electrode activator $LiMn_{1.6}Ni_{0.4}Q_cO_{4+d}$ (Q=F, Cl, Si, Br, N) and discharge capacity.

Furthermore, FIG. 4 shows the relationship between the value c of the positive electrode activator $LiMn_{1.6}Ni_{0.4}Q_cO_{4+d}$ (Q denotes F, Cl, Si, Br and N) and discharge capacity. In any of elements F, Cl, Si, Br and N, the characteristic requirements of both the cycle life and discharge capacity are met when the value c as the volume of elements to be added is within the range from 0.000001 to less than 0.05.

Figure 5:
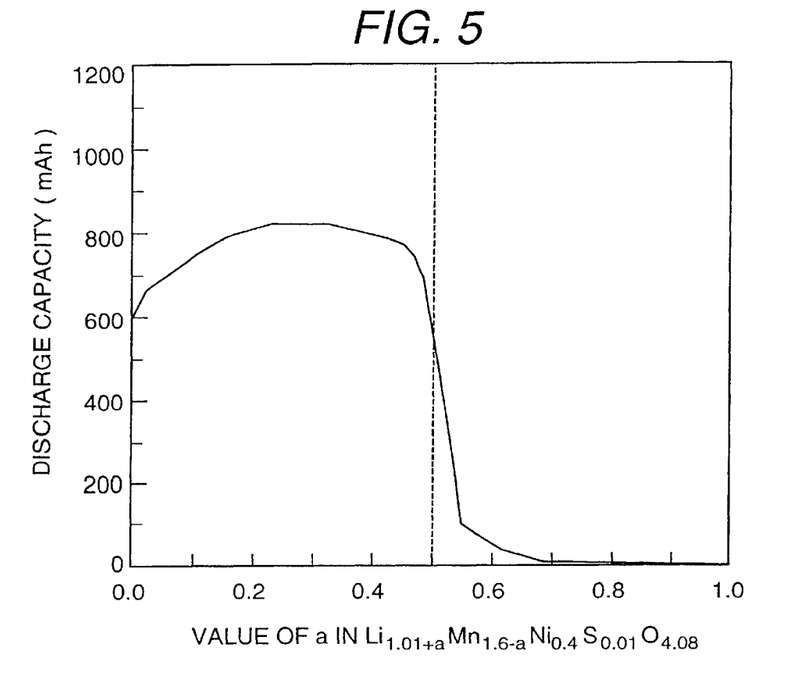
FIG. 5 is a chart representing the relationship between the value a of positive electrode activator $Li_{1.01+a}Mn_{1.6-a}Ni_{0.4}S_{0.01}O_{4.08}$ and discharge capacity.

FIG. 5 shows the relationship between the value a representing the volume of replaced $Li_{1.01+a}Mn_{1.6-a}Ni_{0.4}S_{0.01}O_{4.08}$ and discharge capacity. Discharge capacity exhibits the maximum value when value a is within the range from 0 to 0.5.

Figure 6:
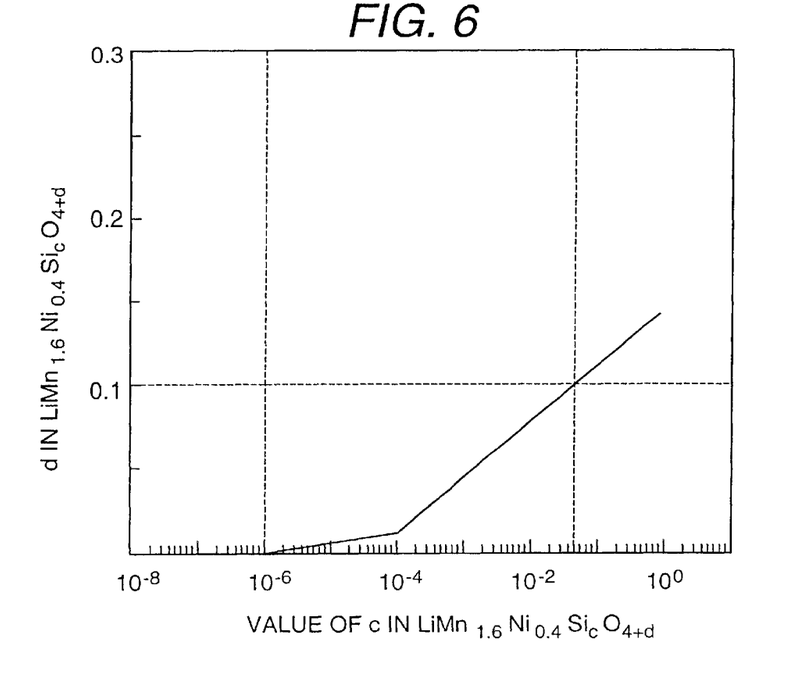
FIG. 6 is a chart representing the relationship between the values c and d of positive electrode activator $LiMn_{1.6}Ni_{0.4}Si_cO_{4+d}$.

FIG. 6 shows the relationship between the value c and value d of $LiMn_{1.6}Ni_{0.4}Si_cO_{4+d}$. When value c is within the range from 0.000001 to less than 0.05, value d is within the range from 0 to 0.1.

Embodiment 2

To synthesize the positive electrode material having a composition of $LiMn_{1.6}Ni_{0.4}O_4$, $Li_2CO_3$, $MnO_2$ and $Ni(NO_3)_2$ as material is weighed out. Then ethanol is added to it, and is mixed by a centrifugal ball mill at a room temperature for one hour. After having been left to stand in air at 660 degrees Celsius for 20 hours, it is baked while being held at 860 degrees Celsius for 20 hours.

Any one of $CS_2$, LiF, LiCl, $SiO_2$, $Li_3PO_4$ and tar is weighed out and added to this to get a mole ration of 0.01. Then ethanol is added thereto, and a centrifugal ball mill is used to mix them at a room temperature for one hour. Then the resulting mixture is baked while being held in air at 600 degrees Celsius for 5 hours.

The positive electrode activator particle of the $LiMn_{1.6}Ni_{0.4}Q_{0.01}O_{4.08}$ (Q denotes F, Cl, Si and S) thus obtained is cut down. TEM-EELS is used to analyze the density of the element to be added from the particle surface into particle interior.

Figure 7A:
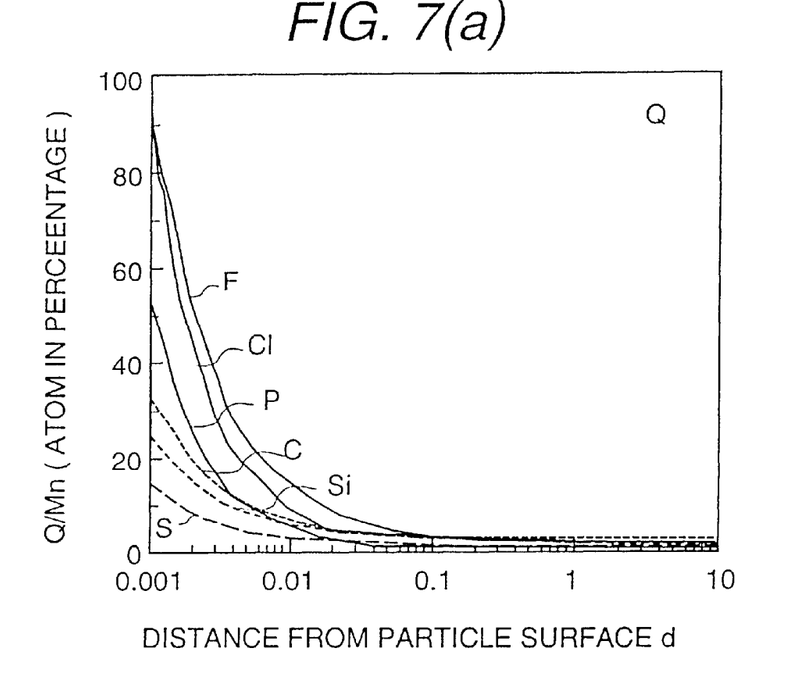
FIG. 7 is a chart representing the relationship between the atom % of added element Q with respect to Mn at distance d from the particle surface to the particle interior.
Figure 7B:
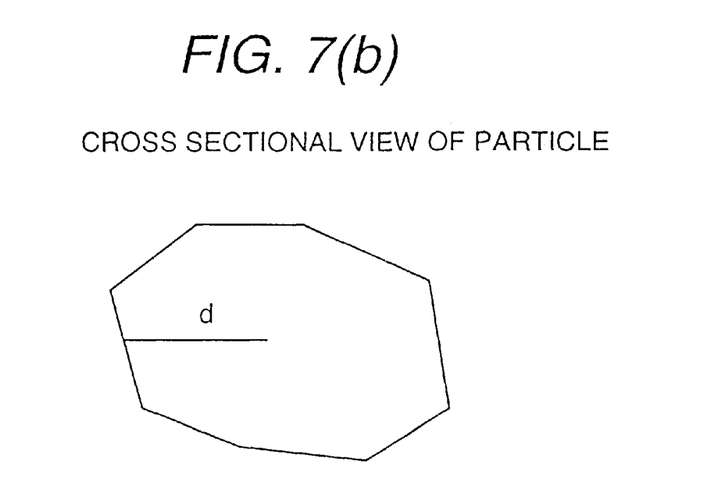

FIG. 7(a) shows the relationship between the atom % of added element Q with respect to Mn at a distance d, which is the distance from the particle surface into the particle interior, as shown in FIG. 7(b). This confirms that the product is a functionally gradient material where a high density of added elements are present on the particle surface layer.

Similarly to Embodiment 1, a prototype battery is created. After having been charged at 1 CmA at a constant current from 4.61 to 5.19 volts, the battery is charged from 4.61 to 5.19 volts for 3 hours at a constant voltage. Then it is discharged to 4.0 volts at 1 CmA at a constant current. Through this experiment, discharge capacity and cycle life is evaluated.

It has been revealed that, in each of the added elements, discharge capacity is as high as 800 to 960 mAh, and the cycle life is as long as 600 cycles. It has also been shown that, in each of them, the average discharge voltage is greater than 4.3 volts and is smaller than 5.0 volts.

Embodiment 3

Similarly to Embodiment 1, the positive electrode activators (No.1 to No.25) having the composition shown in Table 1 are synthesized and used for the experiment. Also similarly to Embodiment 1, discharge capacity and cycle life are evaluated.

In all cases, the average discharge voltage is within the range greater than 4.3 volts and smaller than 5.0 volts. Discharge capacity is as high as 800 to 960 mAh, and cycle life is as long as 600 cycles, exhibiting an extremely long service life.

TABLE 1

| Sample number | Composition of Positive electrode material | Discharge capacity (mAh) | Average discharge voltage (V) | Service life (times) |
|---|---|---|---|---|
| 1 | $Li_{1.04}Mn_{1.26}Ni_{0.3}Co_{0.4}S_{0.01}O_{4.01}$ | 970 | 4.45 | 550 |
| 2 | $Li_{1.04}Mn_{1.26}Ni_{0.3}Cu_{0.4}S_{0.01}O_{4.01}$ | 980 | 4.62 | 630 |
| 3 | $Li_{1.04}Mn_{1.26}Ni_{0.3}Fe_{0.4}S_{0.01}O_{4.01}$ | 950 | 4.58 | 600 |
| 4 | $Li_{1.04}Mn_{1.26}Ni_{0.3}Cr_{0.4}S_{0.01}O_{4.01}$ | 990 | 4.65 | 570 |
| 5 | $Li_{1.04}Mn_{1.36}Ni_{0.3}Fe_{0.2}S_{0.01}O_{4.01}$ | 950 | 4.73 | 560 |
| 6 | $Li_{1.04}Mn_{0.96}Fe_{0.3}Co_{0.5}S_{0.01}O_{4.01}$ | 910 | 4.68 | 510 |
| 7 | $Li_{1.04}Mn_{0.96}Fe_{0.5}Cu_{0.5}S_{0.01}O_{4.01}$ | 990 | 4.69 | 520 |
| 8 | $Li_{1.04}Mn_{0.96}Co_{0.5}Cu_{0.5}S_{0.01}O_{4.01}$ | 930 | 4.47 | 510 |
| 9 | $Li_{1.04}Mn_{0.96}Fe_{0.5}Cr_{0.5}S_{0.01}O_{4.01}$ | 910 | 4.98 | 670 |
| 10 | $Li_{1.1}Mn_{1.57}Ni_{0.3}Cu_{0.03}S_{0.01}O_{4.01}$ | 810 | 4.72 | 680 |
| 11 | $Li_{1.1}Mn_{1.57}Ni_{0.3}Fe_{0.03}S_{0.01}O_{4.01}$ | 920 | 4.64 | 640 |
| 12 | $Li_{1.1}Mn_{1.57}Ni_{0.3}Co_{0.03}S_{0.01}O_{4.01}$ | 820 | 4.65 | 660 |
| 13 | $Li_{1.1}Mn_{1.57}Ni_{0.3}Cu_{0.03}S_{0.01}O_{4.01}$ | 910 | 4.74 | 570 |
| 14 | $Li_{1.2}Mn_{1.0}Ni_{0.1}Fe_{0.02}S_{0.01}O_{4.01}$ | 980 | 4.61 | 610 |
| 15 | $Li_{1.04}Mn_{1.26}Ni_{0.3}Co_{0.4}F_{0.01}O_{4.01}$ | 840 | 4.73 | 570 |
| 16 | $Li_{1.04}Mn_{1.26}Ni_{0.3}Cu_{0.4}F_{0.01}O_{4.01}$ | 870 | 4.35 | 550 |
| 17 | $Li_{1.04}Mn_{1.26}Ni_{0.3}Fe_{0.4}F_{0.01}O_{4.01}$ | 880 | 4.62 | 530 |
| 18 | $Li_{1.04}Mn_{1.26}Ni_{0.3}Cr_{0.4}F_{0.01}O_{4.01}$ | 850 | 4.58 | 640 |
| 19 | $Li_{1.04}Mn_{1.36}Ni_{0.4}Fe_{0.2}F_{0.01}O_{4.01}$ | 890 | 4.55 | 670 |
| 20 | $Li_{1.04}Mn_{0.96}Fe_{0.5}Co_{0.5}F_{0.01}O_{4.01}$ | 850 | 4.73 | 660 |
| 21 | $Li_{1.04}Mn_{0.96}Fe_{0.5}Cu_{0.5}F_{0.01}O_{4.01}$ | 810 | 4.78 | 600 |
| 22 | $Li_{1.04}Mn_{0.96}Fe_{0.5}Cu_{0.5}F_{0.01}O_{4.01}$ | 890 | 4.69 | 590 |
| 23 | $Li_{1.04}Mn_{0.96}Fe_{0.5}Cu_{0.5}F_{0.01}O_{4.01}$ | 830 | 4.77 | 710 |
| 24 | $Li_{1.1}Mn_{1.57}Ni_{0.3}Cu_{0.03}F_{0.01}O_{4.01}$ | 810 | 4.58 | 670 |
| 25 | $Li_{1.1}Mn_{1.57}Ni_{0.3}Fe_{0.03}F_{0.01}O_{4.01}$ | 810 | 4.52 | 680 |
| 26 | $Li_{1.1}Mn_{1.57}Ni_{0.3}Co_{0.03}F_{0.01}O_{4.01}$ | 820 | 4.44 | 740 |
| 27 | $Li_{1.1}Mn_{1.57}Ni_{0.3}Cr_{0.03}F_{0.01}O_{4.01}$ | 820 | 4.62 | 560 |
| 28 | $Li_{1.2}Mn_{1.0}Ni_{0.3}Cr_{0.02}F_{0.01}O_{4.01}$ | 810 | 4.71 | 570 |
| 29 | $Li_{1.04}Mn_{1.36}Ni_{0.4}Fe_{0.2}P_{0.01}O_{4.02}$ | 880 | 4.65 | 520 |
| 30 | $Li_{1.04}Mn_{1.36}Ni_{0.4}Fe_{0.2}P_{0.01}F_{0.01}O_{4.04}$ | 840 | 4.63 | 670 |

Reference Example 1

Similarly to Embodiment 1, $LiMn_{1.6}M_{0.4}O_4$ (M=Ni, Co, Fe, Cu, Cr) is synthesized, and a prototype battery is created.

After having been charged at 1 CmA at a constant current from 4.61 to 5.19 volts, the battery is charged from 4.61 to 5.19 volts for 3 hours at a constant voltage. Then it is discharged to 4.0 volts at 1 CmA at a constant current. Then the cycle life is evaluated. It has been revealed that the cycle life is as short as 40 to 75 cycles.

Embodiment 4

To synthesize a positive electrode material with a composition of $LiMn_{1.6}Ni_{0.4}O_4$. After $Li_2CO_3$, $MnO_2$ and $Ni(NO_3)_2$ as materials are weighed out, ethanol is added thereto, and they are mixed by a centrifugal ball mill at a room temperature for one hour.

The resulting mixture is left to stand in air at 660 degrees Celsius for 20 hours, and is then baked while being held at 860 degrees Celsius for 20 hours to get an electrode, similarly to Embodiment 1.

1.5 mol of $LiBF_4$ dissolved into the mixed solvent of ethylene carbonate and diethyl carbonate at a volume ratio of 30 to 70 is used as electrolyte. Any one of $CS_2$, LiF, LiCl, $SiO_2$, $Li_3PO_4$ and tar is weighed out and added to this product at a volume ratio of 0.01%. The resulting solution is poured into the battery container to produce a battery, similarly to Embodiment 1.

After having been charged at 1 CmA from 4.61 to 5.19 volts at a constant current, the battery is left to stand at 45 degrees Celsius for ten days. Then discharge capacity and cycle life is evaluated, similarly to Embodiment 1. It has been shown in the experiment that, in all cases, the average discharge voltage is within the range greater than 4.3 volts and smaller than 5.0 volts. The discharge capacity is as high as 760 to 860 mAh, and the cycle life is as long as 500 cycles or more.

The present invention provides a positive electrode material for lithium secondary battery and a lithium secondary battery which ensure a high power capacity and a long service life (600 charging and discharging cycles or more).

What is claimed:

1. A positive electrode activator for a lithium secondary battery including non-aqueous electrolyte and including a negative electrode, a positive electrode and lithium salt;
    said positive electrode activator for the lithium secondary battery characterized by inclusion of a multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

2. A positive electrode activator for a lithium secondary battery including non-aqueous electrolyte and including a negative electrode, a positive electrode and lithium salt, wherein said positive electrode activator comprises;
    (1) a multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a, b, c and d are within the range of $0 \leq x \leq 1.1$, $0 \leq a \leq 0.5$, $0.05 \leq b \leq 1.0$, $0.000001 \leq c \leq 0.01$ and $0 \leq d \leq 0.1$, respectively), and
    (2) is a material which is in the form of particles, and where Q has a higher density in a surface layer of the particles than inside the particles.

3. A positive electrode activator for a lithium secondary battery including non-aqueous electrolyte and including a negative electrode, a positive electrode and lithium salt;
    said positive electrode activator characterized by inclusion of a multiple oxide represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a,b, c and d are within the range of $0 \leq x \leq 1.1$, $0 \leq a \leq 0.5$, $0.05 \leq b \leq 1.0$, $0.000001 \leq c < 0.05$ and $0 \leq d \leq 0.1$, respectively).

4. A positive electrode activator for a lithium secondary battery including non-aqueous electrolyte and including a negative electrode, a positive electrode and lithium salt;
    said positive electrode activator comprising a multiple oxide being represented by a general formula $Li_{x+a}Mn_{2-a-b}M_bQ_cO_{4+d}$ (where M denotes at least one element selected from among Ni, Fe, Co, Cu and Cr; Q denotes at least one element selected from among C, N, S, P, Si, F, Cl, I and Br; and x, a,b,c and d are with in the range of $0 \leq x \leq 1.1$, $0 \leq a \leq 0.5$, $0.05 \leq b \leq 1.0$, $0.000001 \leq c \leq 0.01$ and $0 \leq d \leq 0.1$, respectively), and wherein the positive electrode activator is in the form of particles, where Q of said multiple oxide has a higher density in a surface layer of the particles than inside the particles.

5. The positive electrode activator according to claim 1, where c is in the range of $0.00001 \leq c \leq 0.01$.

6. The positive electrode activator according to claim 3, where c is in the range of $0.00001 \leq c \leq 0.01$.

* * * * *